(12) United States Patent
Hiraguchi (10) Patent No.: US 7,401,750 B2
(45) Date of Patent: *Jul. 22, 2008

(54) REEL AND RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 10/894,036

(22) Filed: Jul. 20, 2004

(65) Prior Publication Data

US 2005/0023398 A1 Feb. 3, 2005

(30) Foreign Application Priority Data

Jul. 31, 2003 (JP) .............................. 2003-284010

(51) Int. Cl.
B65H 75/18 (2006.01)

(52) U.S. Cl. ...................... 242/611.1; 242/348; 360/132

(58) Field of Classification Search ................. 242/348, 242/348.2, 611, 611.1; 360/132
See application file for complete search history.

(56) References Cited

U.S. PATENT DOCUMENTS

| | | | |
|---|---|---|---|
| 3,857,531 A | 12/1974 | Jantzen | |
| 4,309,002 A | 1/1982 | Saitou et al. | |
| 4,723,731 A | 2/1988 | Posso | |
| 4,826,097 A | 5/1989 | Grant et al. | |
| 5,031,065 A | 7/1991 | Flor et al. | |
| 5,183,219 A | 2/1993 | Abeille et al. | |
| 5,366,173 A | 11/1994 | Lammers et al. | |
| 5,826,811 A | 10/1998 | Melbye et al. | |
| 5,893,527 A | 4/1999 | Mizutani et al. | |
| 6,034,850 A | 3/2000 | Del Genio et al. | |
| 6,038,112 A | 3/2000 | Kletzl | |
| 6,113,020 A | 9/2000 | Nayak | |
| 6,273,352 B1* | 8/2001 | Johnson et al. | ............. 242/340 |
| 6,315,230 B1 | 11/2001 | Hansen et al. | |
| 6,491,247 B2 | 12/2002 | Huettenegger | |
| 6,508,427 B2* | 1/2003 | Huettenegger et al. | ...... 242/340 |
| 6,817,562 B2* | 11/2004 | Evanoff et al. | ............. 242/340 |
| 6,869,037 B2 | 3/2005 | Hiraguchi | |
| 7,032,853 B2* | 4/2006 | Hiraguchi | .................... 242/340 |
| 2001/0025896 A1* | 10/2001 | Huettenegger et al. | ...... 242/340 |

(Continued)

FOREIGN PATENT DOCUMENTS

JP 11-53862 A 2/1999

(Continued)

*Primary Examiner*—William A Rivera
(74) *Attorney, Agent, or Firm*—Sughrue Mion, PLLC (57) ABSTRACT

A reel of a recording tape cartridge has a reel hub formed in a shape of a hollow cylinder; an annular reel gear; an upper flange; a lower flange; and a reel plate. A reel gear is provided coaxially at an outer surface of a floor of the reel hub, and meshes with a driving gear of a rotating shaft of a drive device. A reference surface is provided integrally at an outer side of the floor. The upper flange extends integrally toward a radial direction outer side from an open end of the reel hub. The lower flange is mounted to a floor side end of the reel hub, and opposes the upper flange. The reel plate is fixed to the outer surface of the floor, and is attracted by a magnet of the rotating shaft without being contacted by the magnet.

3 Claims, 4 Drawing Sheets

U.S. PATENT DOCUMENTS

| | | |
|---|---|---|
| 2003/0173440 A1 | 9/2003 | Hiraguchi |
| 2004/0089755 A1 | 5/2004 | Evanoff et al. |

FOREIGN PATENT DOCUMENTS

| | | | |
|---|---|---|---|
| JP | 2001-351359 A | 12/2001 | |
| JP | 2003-187549 A | 7/2003 | |
| JP | 2003-196945 A | 7/2003 | |

\* cited by examiner

REEL AND RECORDING TAPE CARTRIDGE

CROSS-REFERENCE TO RELATED APPLICATION

This application claims priority under 35 USC 119 from Japanese Patent Application No. 2003-284010, the disclosure of which is incorporated by reference herein.

BACKGROUND OF THE INVENTION

1. Field of the Invention

The present invention relates to a recording tape cartridge which rotatably accommodates a single reel on which a recording tape, such as a magnetic tape or the like, is wound.

2. Description of the Related Art

Recording tapes such as magnetic tapes and the like are used as external recording media for computers and the like. For a recording tape where a large volume of information is recordable and which is wound around a reel, a single reel cartridge whose reel is rotatably accommodated in a compact space is employed.

In such a recording tape cartridge, a reel gear is provided in an annular form at the end surface of a hub of a reel, which hub is shaped as a hollow cylinder having a floor and around which a recording tape is wound between a pair of flanges of the reel. The reel gear is exposed from a gear opening of a case so as to be able to mesh with a driving gear provided at a rotating shaft of a drive device. When the recording tape is to be pulled out from the case and used, in the state in which the reel gear meshes with the driving gear and the reel is positioned in the axial direction, driving force is transmitted to the reel due to the rotation of the rotating shaft such that the reel is driven to rotate.

Positioning of the reel in the axial direction is carried out by the meshing of the reel gear and the driving gear. Specifically, the meshing surfaces of the teeth of the reel gear and the teeth of the driving gear which mesh together are formed in tapered shapes. The reel is positioned in the axial direction in a state in which the respective teeth are meshed together such that there is no backlash therebetween. Therefore, the axial direction reference surface of the reel within the drive device (i.e., at the time when the reel is driven to rotate) is, for example, an imaginary surface which is the meshing pitch surface of the reel gear and the driving gear. Therefore, in a recording tape cartridge equipped with such a reel, the dimensions of the respective portions are determined on the basis of the imaginary reference surface obtained by the meshing together of the reel gear and the driving gear. Thus, designing, and evaluation of the dimensions of the respective portions are complex.

Here, a recording tape cartridge has been conceived of which has a structure in which a reference surface is provided at the end surface of the hub of the reel, separately from the reel gear, and the reel gear does not participate in the function of positioning the reel in the axial direction (see, for example, U.S. Pat. No. 6,273,352). Specifically, three convex portions for reference project at uniform intervals in the peripheral direction from the radial direction outer side portion of the reel gear which is formed in an annular form at the end surface of the hub. The reel is positioned in the axial direction due to references surfaces at the respective convex portions for reference, which are surfaces orthogonal to the axis of the reel, being made to abut a positioning surface of the rotating shaft.

When the reel rotates, there are cases in which the flange, which is at the open end side of the hub opposite the end surface where the reel gear and the like are formed, contacts the recording tape due to wobbling or the like accompanying the rotation of the reel, and force in a direction of pulling the reel gear away from the driving gear is applied to the reel. Further, when the meshing surfaces of the reel gear and the driving gear are formed in tapered shapes as described above, a portion of the torque of the reel is converted, by the tapered surfaces, into thrust in the direction of pulling the reel gear away from the driving gear. Even if these forces are applied, in the state in which the reel gear is used while facing in the direction of gravity (downward), the meshing together of the reel gear and the driving gear is maintained due to the weight of the reel and the recording tape. However, these forces are a cause of destabilizing the rotation of the reel.

Therefore, in the above-described structure disclosed in U.S. Pat. No. 6,273,352, a reel plate, which is formed of a magnetic material, is fixed to the inner side of the reel gear at the end surface of the hub, and the reel plate is attracted and held by a magnet provided at the rotating shaft, without contact between the reel plate and the magnet. The rotation of the reel is stabilized due to this attraction force.

Further, a recording tape cartridge is known which is not provided with a reel plate attracted by a magnet, but in which the reel is urged toward the rotating shaft by a compression coil spring provided within the case (see, for example, U.S. Pat. No. 6,034,850). In this structure, the urging force of the compression coil spring resists force in a direction of pulling the reel gear away from the driving gear, and the rotation of the reel is stabilized. Moreover, at the reel structuring this recording tape cartridge, one of the pair of flanges is provided integrally from the open end of the hub which is formed in the shape of a hollow cylinder having a floor (i.e., is provided from the end portion at the opposite side, in the axial direction, of the end surface where the reel gear and the like are formed), whereas the other flange is attached later to the floor portion side end portion of the hub. In this reel, because the one flange is provided integrally with the open end side of the hub, the hub has high strength (rigidity). Therefore, it can be expected that it is difficult for the hub and the flanges provided at the hub to deform due to the winding pressure of the recording tape or the like, and that wobbling of the flanges which accompanies deformation of the hub is suppressed.

However, it is predicted that, as the recording capacities demanded of recording tape cartridges increase, recording tapes will be made longer and the rotational speeds of reels will be increased, and the times over which reels are driven continuously will be increased. There is therefore the need for reels to be driven to rotate even more stably. To this end, there is still room for improvement in order to rotate a reel more stably.

Further, in the structure disclosed in above-described U.S. Pat. No. 6,034,850, the compression coil spring is disposed between the reel and the case in order to maintain the meshing between the reel gear and the driving gear as described above. Therefore, there is the need to utilize an expensive bearing in order to absorb the relative rotation between the reel and the compression coil spring.

SUMMARY OF THE INVENTION

In view of the aforementioned, an object of the present invention is to provide a reel which can rotate stably while being held at the rotating shaft of a drive device by magnetic force. Another object of the present invention is to provide a recording tape cartridge which is provided with only one of such reels, and in which a recording tape can be stably pulled out from the reel.

In order to achieve the above-described object, a reel relating to a first aspect of the present invention comprises: a hub formed in a shape of a hollow cylinder having a floor, a recording tape being wound around an outer peripheral portion of the hub; a reel gear formed in a coaxial annular form at an outer side of a floor portion of the hub, and meshing with a driving gear of a rotating shaft of a drive device; a reference portion provided integrally with the outer side of the floor portion, and carrying out axial direction positioning by abutting a positioning portion of the rotating shaft; a first flange extending integrally toward a radial direction outer side from an open end of the hub; a second flange mounted to a floor portion side end portion of the hub, and opposing the first flange; and an attracted member formed of a magnetic material, and fixed to the outer side of the floor portion, and attracted by a magnet of the rotating shaft without contact between the magnet and the attracted member.

When the reel is loaded into a drive device at the time when the recording tape is to be used, the reference portion provided at the outer side of the floor portion of the hub abuts the positioning portion of the rotating shaft, such that the reel is positioned in the axial direction. In this state, the reel gear of the reel meshes with the driving gear of the rotating shaft, and the attracted member of the reel is attracted by the magnet of the rotating shaft without contacting the magnet. Then, when the rotating shaft rotates, the torque is transmitted by the driving gear and the reel gear, and the reel rotates. The recording tape is used while being pulled-out from the hub or while being rewound onto the hub as it passes between the first and second flanges.

Here, because the first flange extends integrally from the open end of the hub, the strength (rigidity) of the hub is high, and deformation due to the winding pressure of the recording tape (the tightening of the winding of the magnetic tape) and the like is suppressed. Therefore, wobbling of the first flange provided at the open end side of the hub, which wobbling accompanies deformation, is suppressed. Further, because the first flange is formed integrally with the hub which has the reference portion, the recording tape side surface of the first flange (i.e., the side facing the second flange) can be formed precisely with respect to the reference portion which is provided at the outer side of the floor portion of the hub. Therefore, wobbling of (the recording tape side surface of) the first flange is suppressed even more.

In this way, it is possible to suppress the application of force, which is in the direction of pulling the reel gear away from the driving gear, to the first flange (i.e., the reel) from the recording tape which travels between the flanges as the reel rotates, or it is possible to make this force be small. Therefore, the force in the direction of pulling the reel gear away from the driving gear can be sufficiently resisted by the attraction force (the magnetic force) by which the attracted member is attracted by the magnet of the rotating shaft. The reel is driven to rotate stably while being held at the rotating shaft of the drive device.

In particular, the second flange which is mounted to the hub is a separate member, and the first flange extends toward the radial direction outer side of the hub. Therefore, in a case in which the hub and the first flange are formed by resin molding, the reference portion and the recording tape side surface of the first flange, which are directed in substantially the same direction with respect to the mold, can be formed by the same mold (e.g., a fixed mold, a movable mold, or a die, or the like). In accordance with such a structure, the recording tape side surface of the first flange can be formed even more accurately with respect to the reference portion, without being affected by, for example, positional offset between a fixed mold and a movable mold, and the reel is driven to rotate even more stably.

In this way, the reel of the present invention can be rotated stably while being held at the rotating shaft of the drive device by magnetic force. Further, because the reel has the reference portion which does not depend on the meshing of the reel gear with the driving gear, designing and managing of the dimensions of the reel are easy.

Note that the reference portion may be, for example, a reference surface which is a flat surface or a curved surface, and which planarly-contacts or linearly-contacts the positioning portion, or which point-contacts a plurality of positioning portions. Or, the reference portion may linearly-contact or point-contact the positioning portion which is a flat surface. Moreover, the arrangement of the reel gear, the reference portion, and the attracted member at the outer side of the floor portion of the hub is not particularly limited. However, there are cases in which the reference portion is formed in an annular form which is coaxial with the reel gear, or a plurality of the reference portions are provided at uniform intervals on a circumference which is coaxial with the reel gear. There are cases in which the attracted member is provided in the form of a circle or in the form of a ring which is coaxial with the reel gear.

In order to achieve the above-described object, a recording tape cartridge of a second aspect of the present invention rotatably accommodates only one of the reel of the first aspect within a case, in a state in which the reel gear, the reference portion, and the attracted member are exposed.

In this recording tape cartridge, a single reel is rotatably accommodated within a case, and the reel exposes the reel gear, the reference portion and the attracted member to the exterior. In this way, the reel can be driven by the rotating shaft of a drive device in a state in which the recording tape, which is wound around the outer peripheral surface of the hub, is protected from dust and the like by the case.

Here, when the present recording tape cartridge is to be used, the single reel is rotated, and the recording tape is taken-up onto a take-up reel of a drive device. (The take-up reel is a part which is outside of the recording tape cartridge.) Because this single reel is the reel of the first aspect, the reel is driven to be rotated stably by the rotating shaft of the drive device. Therefore, information can be recorded or played back while the recording tape wound on the single reel is stably pulled-out or rewound.

In this way, the recording tape cartridge has only one of the above-described reel, and the recording tape can be stably pulled-out from this reel. Further, because the reel is held at the rotating shaft by magnetic force, there is no need to provide, within the case, a compression coil spring which urges the reel toward the rotating shaft. Therefore, there is no need to provide a bearing or the like for absorbing relative rotation between such a compression coil spring and the reel. The recording tape cartridge does not become expensive.

As described above, the reel relating to the present invention has the excellent effect that it can rotate stably while being held at the rotating shaft of a drive device by magnetic force. Moreover, the recording tape cartridge relating to the present invention has only one of the above-described reel, and has the excellent effect that a recording tape can be stably pulled-out from the reel.

DETAILED DESCRIPTION OF THE INVENTION

A recording tape cartridge 10 to which is applied a reel 28 relating to an embodiment of the present invention will be described on the basis of FIGS. 1 through 4.

(Overall Structure of Recording Tape Cartridge)

Figure 1A:
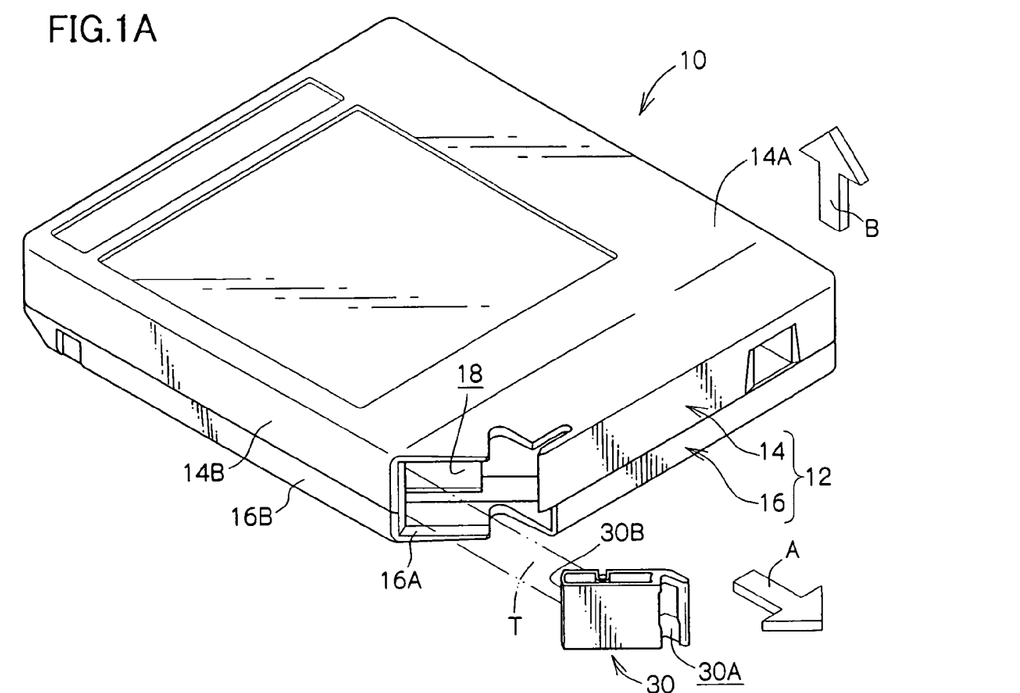
FIG. 1A is a drawing showing the exterior of a recording tape cartridge relating to an embodiment of the present invention, and is a perspective view seen from above.
Figure 1B:
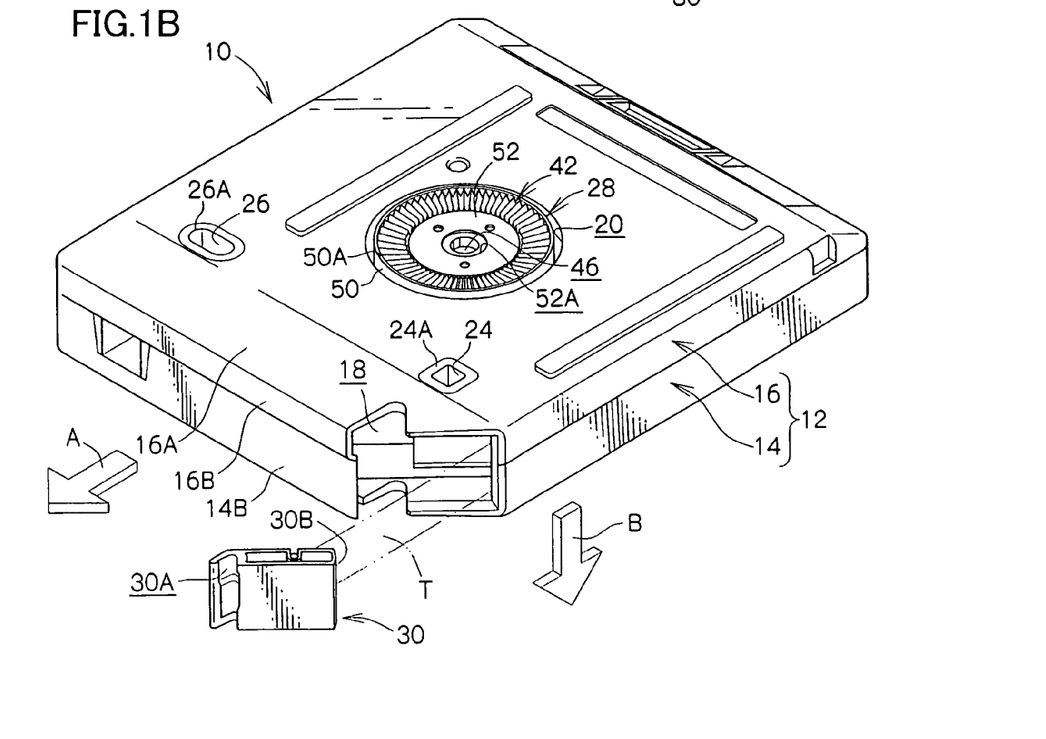
FIG. 1B is a drawing showing the exterior of the recording tape cartridge relating to the embodiment of the present invention, and is a perspective view seen from below.
Figure 2:
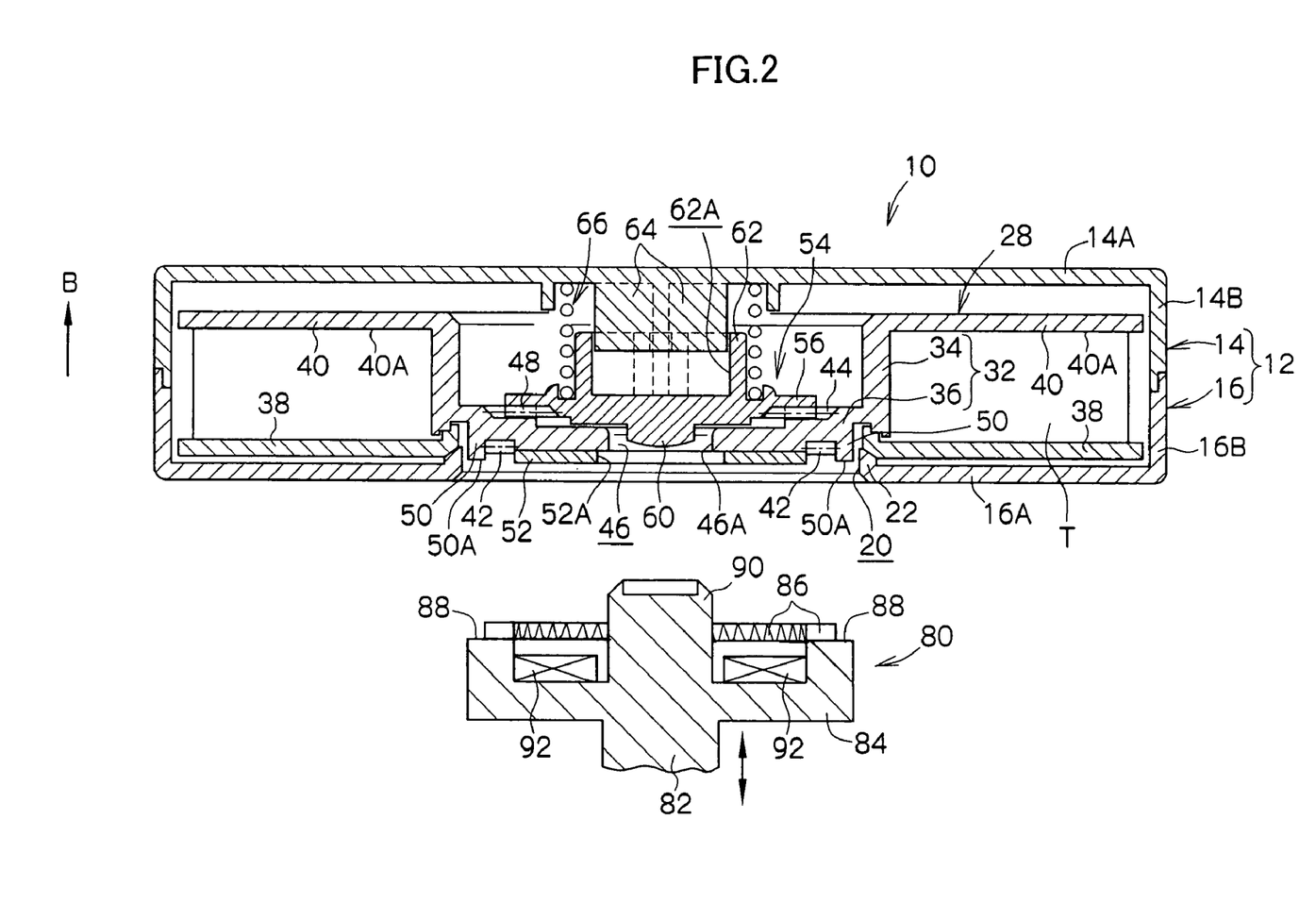
FIG. 2 is a sectional view of the recording tape cartridge relating to the embodiment of the present invention, at a time when the recording tape cartridge is not being used.
Figure 3:
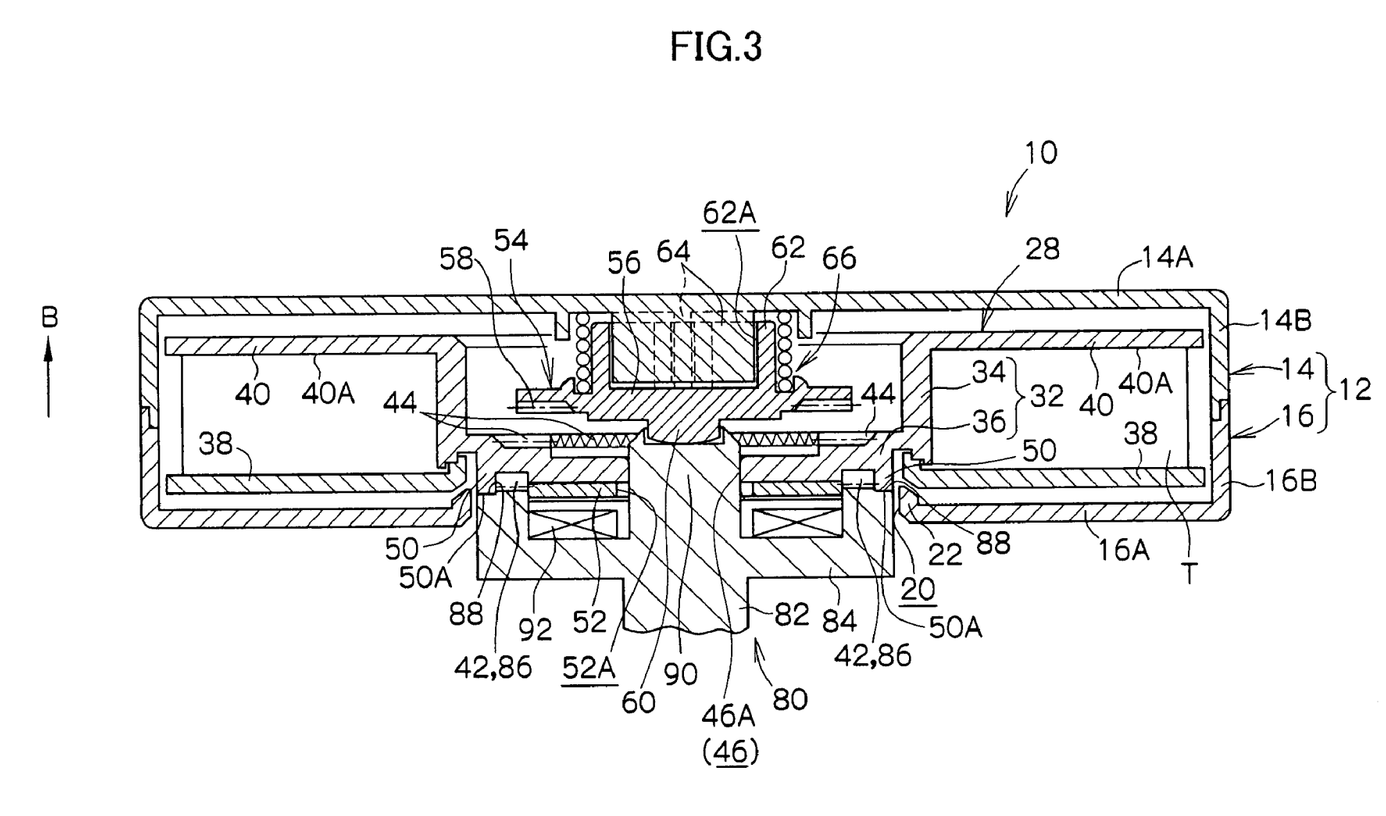
FIG. 3 is a sectional view at a time a reel is being driven to rotate in the recording tape cartridge relating to the embodiment of the present invention.

A perspective view, as seen from above and at an incline, of the recording tape cartridge 10 is shown in FIG. 1A. A perspective view, as seen from below and at an incline, of the recording tape cartridge 10 is shown in FIG. 1B. Sectional views of the recording tape cartridge 10 are shown in FIGS. 2 and 3. Note that arrow A used appropriately in the respective drawings indicates the direction of loading the recording tape cartridge 10 into a drive device, and for convenience of explanation, the side in the direction of arrow A is the front side. Further, the direction indicated by arrow B is upward.

As shown in these drawings, the recording tape cartridge 10 has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 10 into a drive device, the ceiling plate 14A, the peripheral wall 14B, the floor plate 16A and the peripheral wall 16B are respectively cut away, such that an opening 18, which is inclined with respect to the loading direction, is formed. A gear opening 20, which is circular and passes through the floor plate 16A, is formed in the substantially central portion of the floor plate 16A. The gear opening 20 is for exposing a reel gear 42 which will be described later. An annular rib 22 projects toward the inner side of the case 12 at the floor plate 16A at the edge of the gear opening 20, and is for positioning of a reel 28 which will be described later.

A pair of positioning holes 24, 26 are formed in a vicinity of the front end of the outer surface of the floor plate 16A of the case 12. The pair of positioning holes 24, 26 are formed in the shapes of bags within projections (not illustrated) which stand erect from the floor plate 16A toward the interior of the case 12. The positioning holes 24, 26 are disposed so as to be separated from one another on an imaginary line which is orthogonal to the loading direction. The positioning hole 24, which is the positioning hole which is closer to the opening 18, is formed in a substantially square shape, as seen in bottom view, which circumscribes a positioning pin of a drive device. The positioning hole 26 is a long hole whose longitudinal direction runs along the aforementioned imaginary line, and whose width corresponds to the diameter of a positioning pin.

In this way, when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within the drive device.

The portions of the floor plate 16A around the positioning holes 24, 26 are positioning surfaces 24A, 26A which are finished so as to be smoother than the other portions of the floor plate 16A (the design surface of the floor plate 16A). When the positioning pins are inserted into the positioning holes 24, 26, the positioning surfaces 24A, 26A abut positioning surfaces of the drive device which are provided around the positioning pins. In this way, the vertical direction positioning of the recording tape cartridge 10 within the drive device is carried out.

As shown in FIG. 2, the reel 28, which will be described in detail later, is rotatably accommodated within the above-described case 12. Only one reel 28 is provided. A magnetic tape T serving as a recording tape is wound on the reel 28. A leader block 30, which serves as a pull-out member, is attached to the distal end of the magnetic tape T.

When the recording tape cartridge 10 is not being used, the leader block 30 is accommodated and held at the inner side of the opening 18 of the case 12. In this state, the leader block 30 closes the opening 18, and impedes entry of dust and the like into the case 12. An engaging recess 30A is formed in the distal end of the leader block 30. When the magnetic tape T is to be pulled-out within the drive device, a pull-out means, which engages with the engaging recess 30A, pulls the leader block 30 out of the case 12 and guides the leader block 30 to a take-up reel of the drive device. Moreover, the end surface of the leader block 30 at the side opposite the engaging recess 30A is an arc-shaped surface 30B. The arc-shaped surface 30B is fit into the take-up reel and forms a portion of the take-up surface around which the magnetic tape T is taken-up.

(Structure of Reel and Related Parts)

Next, the reel 28 will be described. As shown in FIGS. 2 and 3, the reel 28 has a reel hub 32 which serves as a hub and which structures the axially central portion of the reel 28. The reel hub 32 is formed substantially in the shape of a hollow cylinder having a floor, and has a cylindrical portion 34 around whose outer peripheral surface 34A the magnetic tape T is wound, and a floor portion 36 which closes the bottom portion of the cylindrical portion 34. An upper flange 40 serving as a first flange extends coaxially and integrally toward the radial direction outer side from the open end (the top end) of the cylindrical portion 34 at the reel hub 32. By forming the upper flange 40 integrally at the open end side, the reel hub 32 is a structure having high strength (rigidity).

A lower flange 38, which serves as a second flange and which is formed so as to correspond to the upper flange 40, is joined, by welding or the like, to the bottom end portion of the cylindrical portion 34. Specifically, at the cylindrical portion 34, the middle step of the bottom end portion thereof which is formed in a substantial step-like-shape is a joining surface 34B. In the state in which this joining surface 34B abuts a joining portion 38A which stands erect at the inner edge portion of the lower flange 38, the joining surface 34B and the joining portion 38A are welded together.

In this way, at the reel 28, the magnetic tape T is wound around the outer peripheral surface 34A of the cylindrical portion 34 of the reel hub 32, between the opposing surfaces of the lower flange 38 and the upper flange 40. The magnetic tape T is wound around the reel hub 32 so as to be closer to either the lower flange 38 or the upper flange 40. In the present embodiment, the magnetic tape T is closer to the upper flange 40 (although this is not illustrated). Namely, an opposing surface (bottom surface) 40A of the upper flange 40 which opposes the lower flange 38 is the surface which the magnetic tape T abuts.

Figure 4:
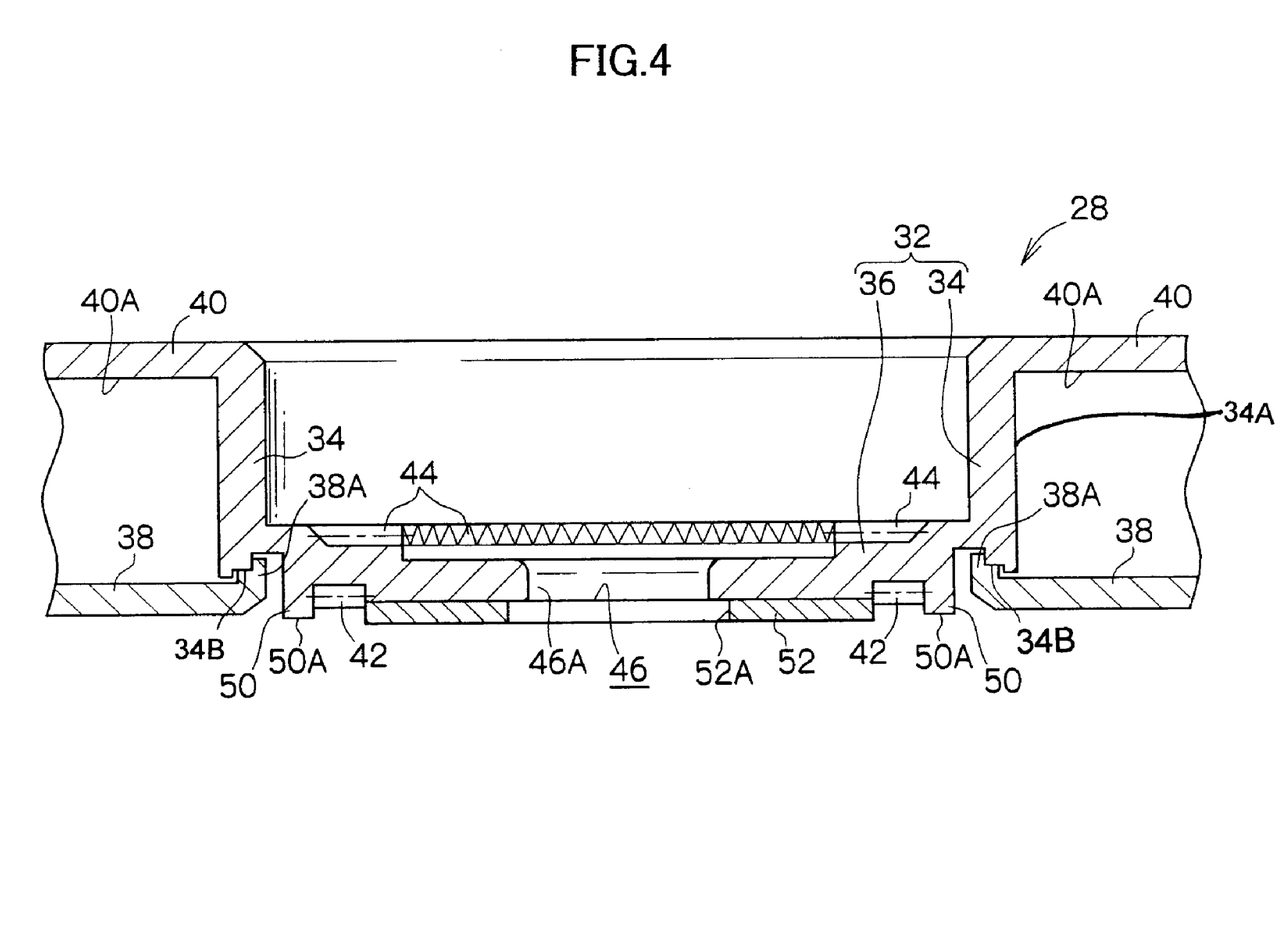
FIG. 4 is a sectional view showing, in an enlarged manner, main portions of the reel relating to the embodiment of the present invention.

As shown in FIG. 4, the reel gear 42 is formed on the whole in the shape of a ring which is coaxial with the reel 28, at the bottom end surface (the outer surface) of the floor portion 36 of the reel hub 32. The reel gear 42 can mesh with a driving gear 86 provided at the distal end of a rotating shaft mechanism 80 (to be described later) of a drive device. An engaging gear 44, which is formed on the whole in the shape of a ring which is coaxial with the reel 28, is provided in a vicinity of the outer periphery of the top surface (the inner surface) of the floor portion 36 of the reel hub 32. The engaging gear 44 can mesh with a braking gear 58 of a braking member 54 which will be described later.

A pass-through hole 46, which serves as a hole and passes through the axially central portion of the floor portion 36 along the direction of plate thickness thereof (the vertical direction) is formed in the floor portion 36. The pass-through hole 46 is a circular hole, and the top edge portion thereof is curved so as to be rounded. The inner surface of the straight portion of the pass-through hole 46, which prescribes the pass-through hole 46 and is other than the rounded top portion thereof, is a fit-together surface 46A. A convex portion 90 of the rotating shaft mechanism 80 fits together with the fit-together surface 46A so as to be slidable along the axial direction. The fit-together surface 46A is a cylindrical surface which is coaxial with the reel 28, and the axial direction length thereof is from 1 mm to 3 mm and may be from 2 mm through 3 mm.

A reference convex portion 50 projects from the bottom end surface of the floor portion 36. The bottom end surface of the reference convex portion 50 is a reference surface 50A which serves as a reference portion. In the present embodiment, the reference convex portion 50 is provided adjacent to the reel gear 42 at the radial direction outer side thereof. Note that the reference convex portion 50, i.e., the reference surface 50A, may be provided in the shape of a ring which is coaxial with the reel 28, or a plurality of the reference convex portions 50 (the reference surfaces 50A) may be provided at uniform intervals on a circumference which is coaxial with the reel 28. (In FIG. 1B, the reference convex portion 50 (the reference surface 50A) is illustrated as a ring-shaped form.)

The portions of the above-described reel 28, other than the lower flange 38, are formed integrally by resin molding. A reel plate 52, which is formed of a magnetic material and serves as an attracted member, is provided integrally and coaxially by insert molding at the inner side of the reel gear 42 at the bottom surface of the floor portion 36 of the reel hub 32. The reel plate 52 is formed in the shape of a disc in which a hole is formed. The axially central portion of the reel plate 52 is a through hole 52A whose diameter is larger than that of the pass-through hole 46. In this way, the inner edge of the reel plate 52 can be prevented from interfering with the convex portion 90 of the rotating shaft.

The reel 28 is accommodated in the case 12, and when the recording tape cartridge 10 is not in use, the reel 28 is set on the annular rib 22. Specifically, a vicinity of the inner edge of the lower flange 38 abuts the annular rib 22 (see FIG. 2), and movement of the reel 28 in the radial direction is restricted due to the reference convex portion 50 being set-in at the inner side of the annular rib 22. Moreover, in the present embodiment, the inner edge portion of the lower flange 38 and the top portion of the annular rib 22 are formed in tapered shapes which correspond to one another. Radial direction movement of the reel 28 is restricted for this reason as well.

In this state, the reel 28, on the whole, is positioned within the case 12, and the reel gear 42 and the reel plate 52 are exposed from the gear opening 20 (see FIG. 1B). Namely, the reel gear 42 faces the exterior of the case 12 from the gear opening 20, without projecting out from the outer surface (the bottom surface) of the floor plate 16A. In this way, operation, i.e., chucking (holding) and driving/rotating, of the reel 28 from the exterior of the case 12 is possible.

When the recording tape cartridge 10 is not in use, rotation of the reel 28 with respect to the case 12 is impeded. Specifically, the braking member 54 is disposed so as to be inserted within the cylindrical portion 34 of the reel hub 32. The braking gear 58, which can mesh with the engaging gear 44, is provided at the braking member 54 at the outer peripheral portion of the bottom surface of a main body portion 56 which is substantially disc-shaped. A releasing projection 60 projects from the axially central portion of the bottom surface of the main body portion 56.

A cross-shaped projection 62 projects from the top surface of the main body portion 56. An engaging groove 62A, which is cross-shaped in plan view, is formed in the cross-shaped projection 62. A cross-shaped rib 64, which projects from the ceiling plate 14A, is inserted in the engaging groove 62A of the cross-shaped projection 62. In this way, the braking member 54 cannot rotate with respect to the case 12, but can slide in vertical directions while being guided by the cross-shaped rib 64. A compression coil spring 66 is disposed in a compressed state between the ceiling plate 14A and the top surface of the main body portion 56 of the braking member 54.

Due to the urging force of the compression coil spring 66, the braking member 54 is urged downward, and the braking gear 58 meshes with the engaging gear 44. Due to the meshing together of the braking gear 58 and the engaging gear 44, the reel 28 is in a locked state in which rotation thereof with respect to the case 12 is impeded. In this state, the releasing projection 60 is positioned within the pass-through hole 46. Further, the reel 28 abuts the annular rib 22 due to the urging force of the compression coil spring 66.

The state in which the reel 28 is locked by the braking member 54 is released due to the recording tape cartridge 10 being loaded into the drive device and the driving gear 86 of the rotating shaft mechanism 80 meshing with the reel gear 42.

The rotating shaft mechanism 80 is structured such that the driving gear 86 is formed in a coaxial ring shape on the top surface of a disc-shaped rotating table 84 which is provided at the distal end of a rotating shaft 82. A positioning surface 88, which serves as a positioning portion and which the reference surface 50A of the reel 28 abuts, is formed at the radial direction outer side portion of the driving gear 86 at the top surface of the rotating table 84. The positioning surface 88 is a flat surface running along a plane which is orthogonal to the axis of the rotating shaft mechanism 80. The convex portion 90, which can enter into and fit together with the pass-through hole 46 of the reel 28, projects from the axially central portion of the top surface of the rotating table 84. The convex portion 90 is formed to a height such that it can enter into the pass-through hole 46, push the releasing projection 60 of the braking member 54, and move the braking member 54 to a position at which the meshed-together state of the braking member 54 and the engaging gear 44 is cancelled. Moreover, a magnet 92 is attached to the top surface of the rotating table 84, between the convex portion 90 and the driving gear 86. The magnet 92 attracts and holds the reel plate 52 of the reel 28 without contacting the reel plate 52.

When the releasing projection 60 is pushed by the convex portion 90 and the braking member 54 is pushed upward as the reel gear 42 meshes together with the driving gear 86, the meshing together of the engaging gear 44 and the braking gear 58 is released, such that the reel 28 becomes able to rotate with respect to the case 12. Due to the convex portion 90 fitting together with the fit-together surface of the pass-through hole 46, the reel is centered with respect to the rotating shaft mechanism 80. Due to the positioning surface 88 of the rotating shaft mechanism 80 abutting the reference surface 50A, the reel 28 is positioned in the axial direction. In this state of being positioned in the axial direction, the reel 28 rises up within the case 12 and moves away from the annular rib 22, while being held at the rotating shaft mechanism 80 by the attraction force of the reel plate 52 by the magnet 92. In this way, as shown in FIG. 3, the reel 28 becomes able to rotate around the axis thereof without contacting the case 12.

As described above, the axial direction position of the reel 28 with respect to the rotating shaft is determined by the reference surface 50A abutting the positioning surface 88. In this way, backlash arises between the reel gear 42 and the driving gear 86 regardless of the configurations of the teeth. Therefore, the meshed-together surfaces of the reel gear 42 and the driving gear 86 may be tapered surfaces, or may be surfaces which are parallel to the aforementioned axis. In the latter structure, as the reel 28 rotates, no thrust in the direction of moving the reel gear 42 away from the driving gear 86 arises, and the transmission torque can be improved. Also when this structure is employed, the accuracy of centering the reel 28 with respect to the rotating shaft mechanism 80 does not deteriorate at all, because centering is carried out due to the convex portion 90 fitting-together with the pass-through hole 46 as described above.

Next, operation of the present embodiment will be described.

At the recording tape cartridge 10 equipped with the reel 28 having the above-described structure, when the magnetic tape T is not in use, the reel 28 is in a locked state in which inadvertent rotation thereof is prevented by the braking member 54 which meshes together with the engaging gear 44 of the reel 28. Further, the opening 18 is closed by the leader block 30.

Here, when the magnetic tape T is to be used, the recording tape cartridge 10 is loaded into a bucket (not illustrated) of a drive device. When the recording tape cartridge 10 is loaded into the bucket, the bucket is lowered, and the rotating shaft mechanism 80 of the drive device relatively approaches the case 12 from below (relatively moves upward with respect to the case 12). Thus, the convex portion 90 of the rotating shaft mechanism 80 presses the releasing projection 60 of the braking member 54 while entering into the pass-through hole 46 of the reel 28 and fitting together with the fit-together surface 46A. In this way, the braking member 54 is pushed upward against the urging force of the compression coil spring 66, such that the state in which rotation of the reel 28 is locked by the braking member 54 is released.

When the rotating shaft mechanism 80 moves further upward, the driving gear 86 meshes with the reel gear 42. Then, when the positioning surface 88 of the rotating shaft mechanism 80 abuts the reference surface 50A of the reel 28, the rotating shaft mechanism 80 moves further upward together with the reel 28. Then, when the bucket is lowered by a set stroke and stops, movement of the rotating shaft mechanism 80 with respect to the case 12 stops. In the axial direction of the reel 28, the reference surface 50A of the reel 28 abuts the positioning surface 88, and the reel 28 is positioned at a rotatable position at which it is raised up within the case 12.

Further, due to the convex portion 90 fitting together with the fit-together surface 46A of the pass-through hole 46 as described above, the reel 28 is centered with respect to the rotating shaft mechanism 80. In this state, the reel 28 is held (chucked) by the rotating shaft mechanism 80, due to the attraction force by which the magnet 92 attracts the reel plate 52.

Due to the bucket, i.e., the recording tape cartridge 10, being lowered within the drive device, the positioning pins of the drive device respectively enter into the positioning holes 24, 26 of the case 12, and the positioning surfaces of the drive device abut the positioning surfaces 24A, 26A of the case 12. The case 12 is thereby positioned in the horizontal directions and in the vertical direction with respect to the drive device.

Thus, while a pull-out pin (not illustrated) of the pull-out means of the drive device engages with the engaging recess 30A of the leader block 30, the pull-out means pulls the leader block 30 out from the case 12 and guides the leader block 30 to the take-up reel of the drive device. The leader block 30 is fit into the take-up reel such that the arc-shaped surface 30B structures a portion of the take-up surface around which the magnetic tape T is taken-up. In this state, when the leader block 30 rotates integrally with the take-up reel, the magnetic tape T is pulled-out from the case 12 through the opening 18 while being taken-up onto the reel hub of the take-up reel.

At this time, the reel 28 of the recording tape cartridge 10 rotates synchronously with the tape-up reel, due to the torque of the rotating shaft mechanism 80 which is transmitted by the driving gear 86 which meshes with the reel gear 42. Information is recorded onto the magnetic tape T or information recorded on the magnetic tape T is played back by a recording/playback head disposed along a predetermined tape path of the drive device.

When the magnetic tape T is rewound onto the reel 28 and the leader block 30 is held in a vicinity of the opening 18 of the case 12, the bucket in which the recording tape cartridge 10 is loaded is raised. Thus, the meshed-together state of the reel gear 42 and the driving gear 86 is cancelled, the convex portion 90 withdraws from the pass-through hole 46, the abutment of the releasing projection 60 and the convex portion 90 is cancelled, and the braking member 54 is returned, by the urging force of the compression coil spring 66, to the rotation locking position at which the braking gear 58 meshes with the engaging gear 44. Moreover, due to the urging force of the compression coil spring 66, the reel 28 also moves downward and returns to its initial state at which the reel gear 42 is exposed from the gear opening 20 while the lower flange 38 of the reel 28 abuts the annular rib 22. In this state, the recording tape cartridge 10 is discharged from the bucket.

Here, because the upper flange 40 extends integrally from the open end of the reel hub 32 (the cylindrical portion 34), the strength (rigidity) of the reel hub 32 is high, and deformation thereof due to the winding pressure of the magnetic tape T (the tightening of the winding of the magnetic tape T) is suppressed. Therefore, deformation (which accompanies the deformation of the reel hub 32) of the upper flange 40 which is provided at the open end side of the reel hub 32, is suppressed, and wobbling of the upper flange 40 accompanying such deformation is suppressed. Moreover, because the upper flange 40 is formed integrally with the reel hub 32 having the reference surface 50A, the opposing surface 40A of the upper flange 40 can be formed precisely with respect to the reference surface 50A provided at the outer side of the floor portion 36 of the reel hub 32. Therefore, wobbling of (the opposing surface 40A of) the upper flange 40 is suppressed even more.

In this way, it is possible to suppress the application of force, which is in the direction of pulling the reel gear 42 away from the driving gear 86, to the upper flange 40 (i.e., to the reel 28) from the magnetic tape T which travels between the upper and lower flanges 40, 38 as the reel 28 rotates, or it is possible to make this force be small. Therefore, the force in the direction of pulling the reel gear 42 away from the driving gear 86 can be sufficiently resisted by the attraction force (magnetic force) by which the reel plate 52 is attracted by the magnet 92. The reel 28 can be driven to rotate stably while being held by the rotating shaft mechanism 80 of the drive device. Further, even if the meshed-together surfaces of the reel gear 42 and the driving gear 86 are tapered surfaces which are inclined with respect to the axial direction, because the force in the direction of pulling the reel gear 42 away from the driving gear 86 is small as described above, the thrust which the tapered surfaces generate due to rotation of the reel 28 can be sufficiently resisted by the aforementioned attraction force.

Further, the lower flange 38 is formed as a member separate from the reel hub 32, and is attached to the reel hub 32 later. Therefore, in a case in which the reel hub 32 and the upper flange 40, which extends from the reel hub 32 outwardly in the radial direction, are formed by resin molding, the downwardly-facing reference surface 50A and the downwardly-facing opposing surface 40A of the upper flange 40 can be formed by the same mold (e.g., the portion where they are provided integrally can be formed in a fixed mold which structures the mold). In accordance with this structure, the opposing surface 40A of the upper flange 40 can be formed accurately with respect to the reference surface 50A, without being affected by, for example, offset of a movable mold with respect to the fixed mold. The reel 28 can be drive to rotate even more stably.

In this way, the reel 28 relating to the present embodiment can be rotated stably while being held at the driving shaft mechanism 80 of the drive device by magnetic force. Further, because the reel 28 has the reference surface 50A which does not depend on the meshing of the reel gear 42 with the driving gear 86, designing of the reel 28 and managing of the dimensions thereof are easy.

In the recording tape cartridge 10, the reel 28 is positioned (centered) accurately and rotates stably as described above. Therefore, while the magnetic tape T of the drive device is being taken-up onto or drawn-out from the take-up reel of the drive device, the magnetic tape T can be pulled-out or rewound stably, and recording or playback of information can be carried out. In this way, the recording tape cartridge 10 relating to the present embodiment is provided with only the one reel 28, and the recording tape can be pulled out stably from the reel 28. Further, in the recording tape cartridge 10, the reel 28 is held at the rotating shaft mechanism 80 by the magnetic force of the magnet 92. Therefore, there is no need to provide, within the case 12, a compression coil spring which urges the reel 28 toward the rotating shaft mechanism 80, and there is no need to provide a bearing or the like for absorbing relative rotation between such a compression coil spring and the reel 28, and the recording tape cartridge 10 does not become expensive.

Note that the above-described embodiment is an example of a structure in which the reference convex portion 50, at which the reference surface 50A is formed, is provided at the outer side of the reel gear 42 at the floor portion 36 of the reel hub 32, and the reel plate 52 is provided at the inner side of the reel gear 42. However, the present invention is not limited by the configurations and the arrangement of the reel gear 42, the reference surface 50A which is the reference portion, and the reel plate 52 which is the attracted member. Accordingly, the reel plate 52 may be provided at the outer side of the reel gear 42, and the reference surface 50A may be provided at the inner side of the reel gear 42. Further, the reference portion in the present invention is not limited to the single structure of a surface which is orthogonal to the axis of the reel 28 (a surface which is parallel to the opposing surface 40A). For example, the reference portion may be a tapered surface corresponding to the positioning surface 88 which is formed in a tapered shape. Or, a plurality of reference portions may be provided in the peripheral direction, and may substantially point-contact the positioning surface 88.

The above-described embodiment is an exemplary structure having, as the hole, the pass-through hole 46 which passes through the floor portion 36. However, the present invention is not limited to the same. For example, a structure in which the pass-through hole 46 is not provided may be used. Instead of the pass-through hole 46, a hole portion, which is open at the bottom surface of the floor portion 36 and with which the convex portion 90 fits together, may be provided. These structures can be applied, for example, to a recording tape cartridge having a structure in which the locked state of the braking member 54 is operated by another portion (e.g., a structure having a clutch member in which leg portions, which are pushed by the addenda of the driving gear 86, are exposed at the region where the reel gear is formed, or a structure in which an operation portion, which is operated by a releasing portion which is independent from the rotating shaft mechanism 80 of the drive device, is exposed from a window portion provided in a peripheral wall of the case 12, or the like). Accordingly, it goes without saying that the present invention is not limited by the structure of the locking means (the braking member 54, the compression coil spring 66, and the like) which impedes rotation of the reel when the recording tape cartridge is not being used.

Moreover, the above-described embodiment and modified examples describe, as an example, a structure in which the reel plate 52 is insert molded. However, the present invention is not limited to the same, and, for example, the reel plate 52 may be attached later by caulking or the like.

In addition, the above-described embodiment and modified examples are exemplary structures which are applied to the so-called single-reel recording tape cartridge 10 in which only the single reel 28 is accommodated within the case 12. However, the present invention is not limited to the same, and, for example, the reel 28 may be used as one or both of the reels of a two-reel recording tape cartridge in which two reels (for drawing-out and taking-up) are accommodated. Moreover, the single-reel recording tape cartridge in the present invention is not limited to the above-described recording tape cartridge 10. For example, in place of the leader block 30, a leader tape or a leader pin may be used as the leader member for the pulling-out of the magnetic tape T. Accordingly, the recording tape cartridge in the present invention is not limited to the structure in which the opening 18, for the pulling-out of the magnetic tape T, is closed by the leader block 30 when the recording tape cartridge is not being used. An opening corresponding to the opening 18 may be opened and closed by a shielding member (e.g., a sliding door, a rotating door, or the like) other than a leader member.

Further, the magnetic tape T is used as the recording tape in the above-described embodiment. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

What is claimed is:

1. A combination comprising a drive device and a reel,
   the drive device comprising a rotating shaft including a driving gear; and
   the reel, comprising:
   a hub formed in a shape of a hollow cylinder having a floor portion, a recording tape being wound around an outer peripheral portion of the hub;
   a reel gear formed in a coaxial annular form at an outer side of the floor portion of the hub, and meshing with the driving gear of the rotating shaft of the drive device;
   a reference projection portion provided integrally with the outer side of the floor portion, and carrying out axial direction positioning by abutting a positioning portion of the rotating shaft, the reference projection portion contacting the radial direction outer side of the reel gear;
   a first flange extending integrally toward a radial direction outer side from an open end of the hub;
   a second flange mounted to a floor portion side end portion of the hub, and opposing the first flange; and
   an attracted member formed of a magnetic material, and fixed to the outer side of the floor portion, and attracted by a magnet of the rotating shaft without contact between the magnet and the attracted member;
   wherein the rotating shaft further comprises a convex portion; and
   the reel further comprises a pass-through hole located on an axis of the reel which has a fit-together surface wherein,
   the convex portion may be inserted into the pass-through hole and contact the fit-together surface to center the reel with respect to the drive device.

2. The combination according to claim 1, wherein the positioning portion and the rotating shaft are provided in one piece.

3. The combination according to claim 1, wherein the positioning portion is a flat surface extending along a plane which is orthogonal to an axis of the rotating shaft.

* * * * *